Jan. 21, 1941.  L. B. SASLAW  2,229,310

SURGICAL LIGHT

Filed July 31, 1939

INVENTOR.
L. B. Saslaw
BY
ATTORNEY

Patented Jan. 21, 1941

2,229,310

UNITED STATES PATENT OFFICE 2,229,310

SURGICAL LIGHT

Lewis B. Saslaw, Stockton, Calif.

Application July 31, 1939, Serial No. 287,577

1 Claim. (Cl. 128—22)

This invention relates in general to an appliance for use in connection with surgery, and in particular the invention is directed to a head supported light unit for surgeons, and is intended to be used in substitution of the common head mirror now used. The common head mirror, which comprises essentially a concave mirror with central viewing aperture and supported by a head band, requires a separate source of light, and the mirror must thus be held in such a position as to reflect the light from such source to the point to be viewed by the surgeon. As a result, it is difficult for a surgeon, especially when performing an operation, to keep his head and the supported mirror in correct position to reflect the light to the desired point.

It is therefore the principal object of my invention to provide a device which, while having a body and viewing aperture much like the usual head mirror, does not rely on a mirror to reflect light but rather carries a light source in unitary relation and arranged to cast a positive and intense beam of light on the point viewed by the surgeon through the aperture.

Another object of the invention is to provide a device of the character described which includes a multiplicity of light globes whereby if one or even several globes burn out while the device is in use, the remaining globes will supply sufficient light for the completion of an operation; these globes being mounted in connection with the device in novel arrangement, and each supported for ready removal and replacement.

A further object of the invention is to produce a simple and inexpensive device and yet one which will be exceedingly effective for the purpose for which it is designed.

These objects I accomplish by means of such structure and relative arrangement of parts as will fully appear by a perusal of the following specification and claim.

In the drawing similar characters of reference indicate corresponding parts in the several views.

Figure 1:
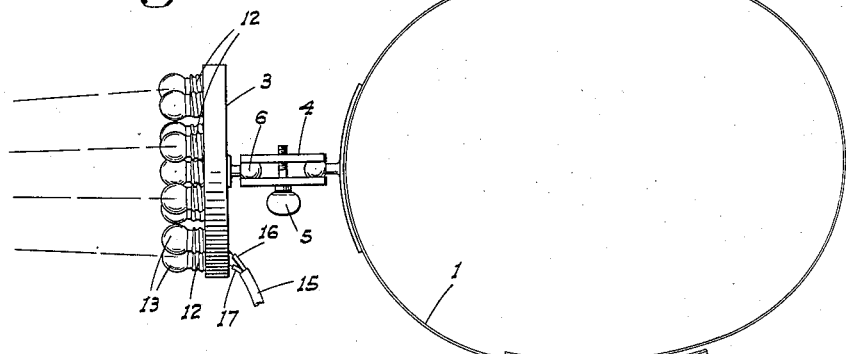
Figure 1 is a top plan view of the device.

Referring now more particularly to the characters of reference on the drawing, the device comprises an adjustable head band 1 of conventional form and including an adjustment nut 2. A circular globe supporting body, indicated generally at 3, is swivelly mounted on the head band and in front thereof by means of a double ball and socket type swivel connection 4 which includes a locking screw 5. The ball element 6 at the forward end of the connection is fixed with the back of the body 3 adjacent the periphery thereof; the body depending therefrom.

The circular body 3 comprises an external metallic shell which includes, in integral relation, a front plate 7 and a peripheral portion 8, flanged inwardly from its rear edge as at 8a; a pair of dielectric discs 9 being clamped in face to face relation between the front plate 7 and flange 8a. A metallic disc 10 of slightly less diameter than the dielectric discs 9 is interposed therebetween in concentric relation.

The body, formed as above, is provided with a central or axial viewing aperture 11 of relatively small diameter.

Figure 2:
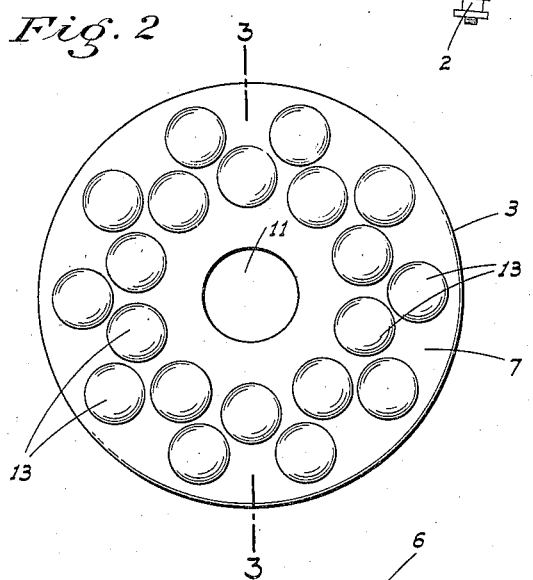
Figure 2 is an enlarged front view of the circular body and multiplicity of light globes mounted thereon.
Figure 3:
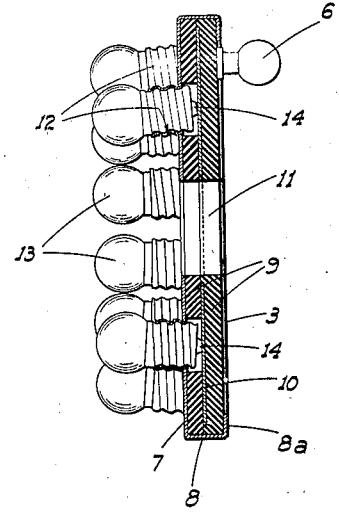
Figure 3 is a cross section on line 3—3 of Fig. 2.

A multiplicity of metallic sockets 12 are secured on the front plate 7 and project therefrom to support small pre-focused electric globes 13 of the common flashlight type screwed therein; the sockets being arranged in two circular rows one within the other and with corresponding globes in said rows being staggered relative to each other as shown in Fig. 2. The rows are concentric with the viewing aperture 11, and the sockets are mounted in such angular position that the beam from each globe is focused on a point or area on the visual axis a pre-determined distance in front of the body 3.

Figure 4:
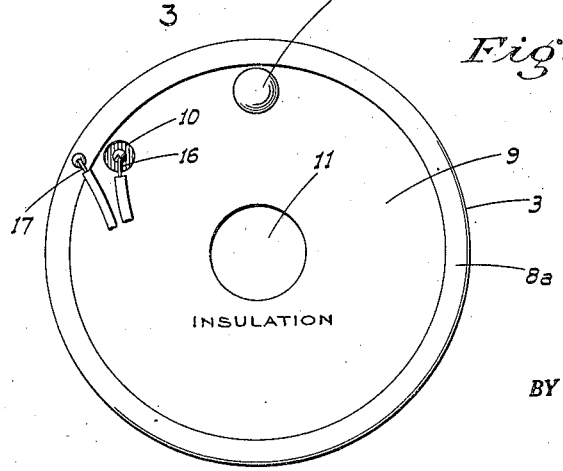
Figure 4 is an enlarged back view of the globe supporting body.

The sockets 12 are open at the bottom through front plate 7 and the adjacent dielectric disc 9 so that the end terminal 14 of each globe 13 engages metal disc 10. Current for the globes is supplied from a separate source (not shown) through a flexible electric cord 15 whose pair of wires 16 and 17 are connected with disc 10 and flange 8a as shown in Fig. 4. The circuit is then completed to the globes through said disc 10 and through the metal shell to sockets 12, as is obvious.

In use, the device is employed in the same manner as the common head mirror but does not rely on a separate source of light; the wearer adjusting the aperture 11 to his visual axis and looking then through said aperture. The object viewed is always brilliantly illuminated from all angles by the focused rows or banks of globes 13, and regardless of which way the surgeon may turn his head. The light is constantly focused on a point in the visual axis, which is especially important when viewing into small or deep cavities.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claim.

Having thus described my invention, what I claim as new and useful and desire to secure by Letters Patent is:

A surgical light unit comprising a body having a viewing aperture therethrough, means to support the body in front of a person's eye in position for viewing through said aperture, said body including, in unitary relation, a metallic front plate, a metallic contact plate disposed rearwardly of said front plate, and a dielectric member interposed between said plates; a plurality of sockets mounted on the front plate, said sockets being open at the bottom through said front plate and dielectric member, electric globes in said sockets and with their end contacts engaging said contact plate, and means to supply current to said globes through said front plate and contact plate.

LEWIS B. SASLAW.